US011321628B2

(12) United States Patent
Rabenoro et al.

(10) Patent No.: US 11,321,628 B2
(45) Date of Patent: May 3, 2022

(54) DECISION AID SYSTEM AND METHOD FOR THE MAINTENANCE OF A MACHINE WITH LEARNING OF A DECISION MODEL SUPERVISED BY EXPERT OPINION

(71) Applicant: SAFRAN AIRCRAFT ENGINES, Paris (FR)

(72) Inventors: Tsirizo Rabenoro, Melun (FR); Jerome Henri Noel Lacaille, Rosny sous Bois (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 882 days.

(21) Appl. No.: 15/759,394

(22) PCT Filed: Sep. 15, 2016

(86) PCT No.: PCT/FR2016/052333
§ 371 (c)(1),
(2) Date: Mar. 12, 2018

(87) PCT Pub. No.: WO2017/046530
PCT Pub. Date: Mar. 23, 2017

(65) Prior Publication Data
US 2018/0253664 A1 Sep. 6, 2018

(30) Foreign Application Priority Data

Sep. 18, 2015 (FR) ..................................... 15 58811

(51) Int. Cl.
*G06N 20/00* (2019.01)
*G05B 23/02* (2006.01)
*B64F 5/60* (2017.01)

(52) U.S. Cl.
CPC .............. *G06N 20/00* (2019.01); *B64F 5/60* (2017.01); *G05B 23/0283* (2013.01)

(58) Field of Classification Search
CPC ........................... G06N 20/00; G05B 23/0283
See application file for complete search history.

(56) References Cited

U.S. PATENT DOCUMENTS

| 5,132,920 A | 7/1992 | Bellows et al. |
| 7,587,296 B2 | 9/2009 | Harvey, Jr. et al. |

(Continued)

FOREIGN PATENT DOCUMENTS

EP 2 634 660 A1 9/2013

OTHER PUBLICATIONS

International Search Report dated Dec. 13, 2016, in PCT/FR2016/052333 filed Sep. 15, 2016.

(Continued)

*Primary Examiner* — Jelani A Smith
*Assistant Examiner* — Toya Pettiegrew
(74) *Attorney, Agent, or Firm* — Oblon, McClelland, Maier & Neustadt, L.L.P.

(57) ABSTRACT

A decision aid system, method and computer program product for the maintenance of a machine, including anomaly detection modules to determine health indicators on the basis of measurements of physical parameters of the machine, a calculator to compute an operating diagnosis on the basis of health indicators by applying a decision model capable of learning, and a man-machine interface to allow an expert to consult the health indicators and to declare a diagnosis. The calculator can compare an operational diagnosis computed based on a set of health indicators with at least one expert diagnosis declared after consultation of the set of health indicators, and can modify the decision model in the event of disagreement between the anomaly diagnosis computed and an expert diagnosis declared.

11 Claims, 2 Drawing Sheets

(56) References Cited

U.S. PATENT DOCUMENTS

| | | | |
|---|---|---|---|
| 2004/0039483 A1* | 2/2004 | Kemp | G05B 13/0265 700/245 |
| 2004/0162751 A1* | 8/2004 | Tsyganskiy | G06Q 10/10 705/7.32 |
| 2009/0228409 A1* | 9/2009 | Eklund | G06F 11/008 706/12 |
| 2010/0100201 A1* | 4/2010 | Chen | G05B 23/0272 700/67 |
| 2012/0151290 A1 | 6/2012 | Singh et al. | |
| 2012/0304007 A1* | 11/2012 | Hanks | G05B 23/0216 714/26 |
| 2013/0218522 A1* | 8/2013 | Suzuki | G05B 23/0208 702/183 |
| 2015/0009061 A1* | 1/2015 | Lundqvist | G01S 13/87 342/27 |
| 2015/0254568 A1* | 9/2015 | Zhao | G06N 5/025 706/12 |

OTHER PUBLICATIONS

French Search Report dated Jul. 7, 2016, in French Application 1558811 filed Sep. 18, 2015.

* cited by examiner

DECISION AID SYSTEM AND METHOD FOR THE MAINTENANCE OF A MACHINE WITH LEARNING OF A DECISION MODEL SUPERVISED BY EXPERT OPINION

TECHNICAL DOMAIN

The domain of the invention is systems for monitoring the state of health of a machine, such as an engine, and particularly an aircraft engine. This invention relates more particularly to a decision aid automated system for performing maintenance operations on a machine.

STATE OF PRIOR ART

Monitoring of the state of health of a machine aims at improving its safety and reliability. Particularly concerning aircraft engines, this monitoring is aimed at avoiding or limiting in-flight shutdowns (IFSD), reducing flight delays and cancellations (D&C), and more particularly facilitating engine maintenance by anticipating failures and even identifying faulty or defective components.

Different monitoring or anomaly detection devices are used to check correct operation of the different engine components, so as to monitor the state of health of an aircraft engine. For example, there is one monitoring device to analyse the behaviour of the ignition process, another to analyse the temperature of gases, yet another to detect clogging of filters, and another to analyse oil and fuel consumption, etc.

Data generated by these detection and monitoring devices are used by ground maintenance services using "health monitoring" algorithms. These algorithms raise alerts when they detect an anomaly. These alerts are then used by experts in ground maintenance teams to verify the operational capabilities of the engine as a function of the alerts raised.

Good calibration of health monitoring algorithms is essential to raise useful alerts when the engine becomes degraded and not to raise alerts for example following a false detection of an anomaly.

The objectives are firstly to immobilise engines for the shortest possible time to make their operation cost effective, and secondly to judiciously anticipate maintenance operations to avoid expensive repairs. For example, it may be useful to replace a specific part as soon as a damage ratio is reached, so as to limit the impact of this degradation on other parts connected to the damaged part. In another example, when alerts are raised without good reason, the engine may be immobilised for safety reasons, although an expert verification confirms that the engine is flightworthy.

At the present time, health monitoring algorithms are calibrated imperfectly due to lack of data about degradation, if any, because engines are repaired before damage can occur. In the lack of supervision data, anomaly detection algorithms based only on normal cases have to be used, although they are not very suitable for identifying types of degradation. To make this identification, it is needed to use signature models constructed by simulation based on aeronautical engineers' expertise, but that has not necessarily been observed.

Furthermore, detection and monitoring devices produce a wide variety of indicators that can be correlated with each other. Experts can find it difficult to make a decision about whether or not alerts are justified by observing indicators. Therefore, they have to spend time on every specific case of an anomaly, although the large number of engines being monitored obliges them to take decisions in increasing shorter times.

PRESENTATION OF THE INVENTION

The purpose of the invention is to disclose the most automatic possible decision aid system, thus accelerating work by experts while improving the anomaly detection rate without increase the false alarms rate.

To achieve this, the invention discloses a system like that defined in claim 1 and a method like that defined in claim 10.

Some preferred but non-limitative aspects of the system are defined by the dependent claims 2 to 9.

BRIEF DESCRIPTION OF THE DRAWINGS

Other aspects, purposes, advantages and characteristics of the invention will be better understood after reading the detailed description given below of preferred embodiments of the invention, given as non-limitative examples, with reference to the appended drawings on which.

DETAILED PRESENTATION OF PARTICULAR EMBODIMENTS

In general, the invention discloses a tool capable of automatically providing information helpful for making decisions about machine maintenance operations. One advantageous application of the invention is maintenance of an aircraft engine, although this is not limitative.

In this framework, the invention discloses a decision aid system for maintenance of a machine that automatically computes an operational diagnosis for the machine. An operational diagnosis refers to information about whether or not a particular type of operation (such as an anomaly) is present, potentially accompanied by a probably of occurrence of the particular operation.

The principle of the invention is to correlate the operation diagnosis originating from automatic calculations with diagnoses made by experts. Automatic calculations are made using a decision model capable of learning, and this learning takes place iteratively so as to minimise the diagnosis error between the system response and expert responses.

Figure 1:
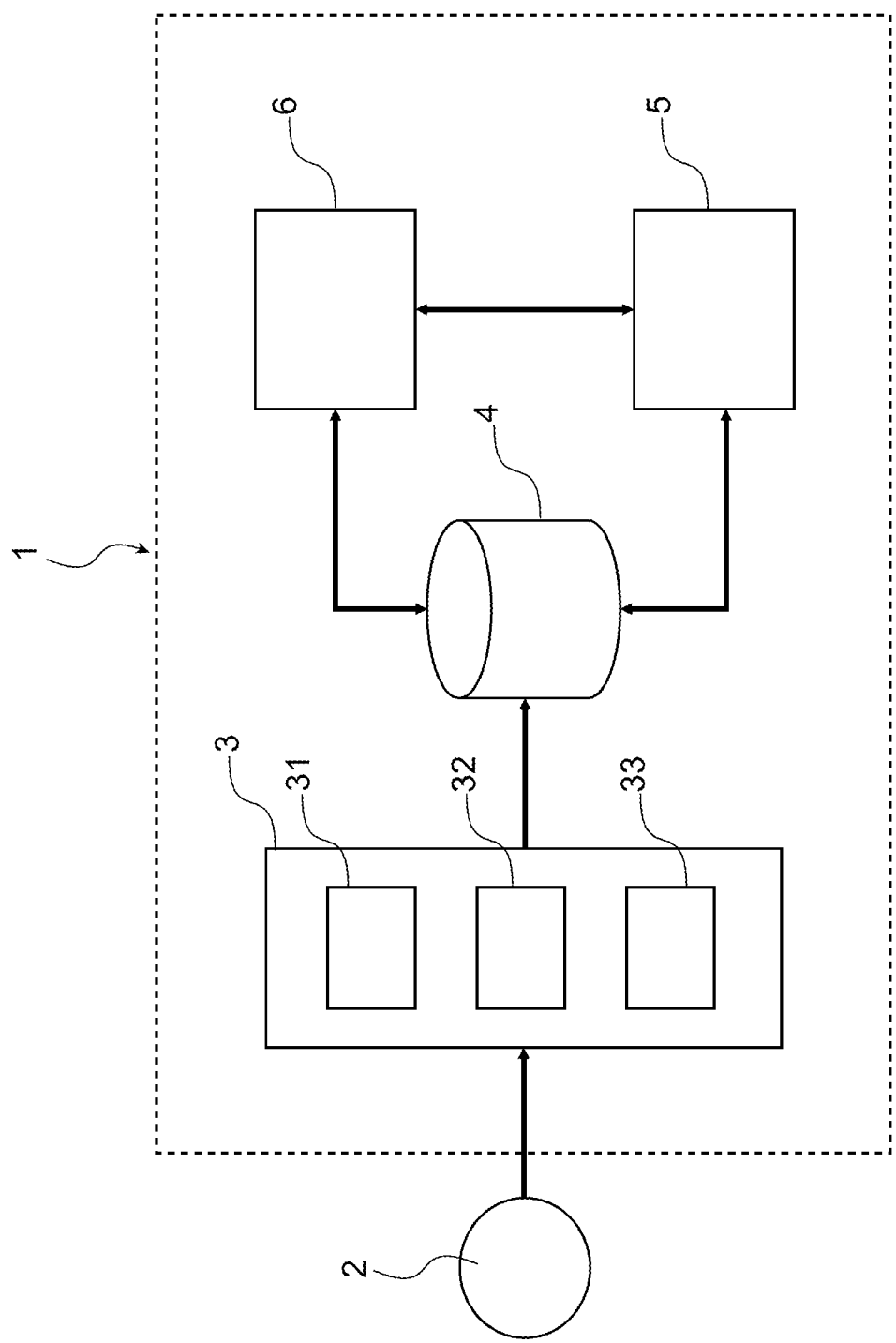
FIG. 1 diagrammatically illustrates a decision aid system for maintenance of a machine according to one possible embodiment of the invention.

With reference to FIG. 1, the invention relates more particularly to a decision aid system 1 for maintenance of a machine such as an aircraft engine 2.

The system 1 comprises an anomaly detection unit 3 that comprises various anomaly detection modules 31, 32, 33. These modules receive physical parameter measurements related to different machine components and are configured to determine health indicators from these measurements. These health indicators are input to a database 4.

The health indicators produced by the modules 31, 32, 33 are the results of calculations, generally outputs from algorithms, or statistical test results. For example, they may be outputs from health monitoring algorithms or summaries or results of test analyses.

Typically, for surveillance of aircraft engine fleets, measurements made during each flight are analysed by a fleet manager. These analyses are made by anomaly detection modules 31, 32, 33 that implement rupture detection algorithms in the behaviour of the engine from flight to flight. There are several sorts of ruptures (clean or progressive), several ways of observing them (long or short term), and about a hundred signals to be looked at separately or in combination. Therefore there is a wide range of anomaly detection modules (several thousand) that all supply their health indicators after each flight.

The system 1 also comprises a calculator 5 configured to compute an operational diagnosis starting from health indicators supplied by the anomaly detection modules 31, 32, 33. This calculation is made by applying a decision model that comprises a set of rules for merging the health indicators and synthesising the merged information to provide an operational diagnosis.

For example, the last 10 results from all anomaly detection modules 31, 32, 33 can be input to the calculator 5. It produces a single item of output information, for example information that indicates that there is no failure or information that indicates a given type of failure (performance, compressor, turbine, vibration, etc.), on one or several measured signals using successive detections to confirm the information thus produced.

In the framework of the invention, the decision model is capable of supervised learning, in other words it can automatically generate its rules from a learning database containing health indicators and validated operational diagnoses, in this case the database 4.

This learning can be made by different methods. For example, it can make use of a naive Bayes or a random forest type algorithm. It can also be based on regression methods (such as neuron networks) or it can make use of a reasoner using fuzzy logic.

The decision model can thus be a naive Bayes classification or a classification derived from the application of a decisional random forest algorithm. The naive Bayes type algorithm gives results that experts can easily understand, and is used in preference when the process is initialised. It is more didactic for experts, so that they can be more confident in the invention. Then, once the initialisation phase is complete, a "random forest" type algorithm can be used; it gives better results, but they are more difficult to interpret.

The invention proposes to correct iteratively this model, so that the quality of the operating diagnosis information is improved. To achieve this, the decision model does a relearning step, that consists of reconsidering decision rules generated during learning, and relearning them so as to supply a more reliable operating diagnosis. A new decision model is generated at the end of each relearning step. In other words, the decision model is modified in each relearning iteration.

In order to initiate learning of the decision model, sub-sets of available health indicators can be chosen at random (the size and type of which depend on the required precision; and also sets of health indicators for which there is already a validated operational diagnosis). An expert analyses each data sub-set and determines whether or not there is an anomaly, and its type (labelling). He can add a quality level or confidence level to his expert diagnosis. This diagnosis and this quality level are then related to data sub-sets in the database 4.

Still with reference to FIG. 1, the decision aid system 1 comprises a man-machine interface 6 configured so as to allow at least one expert to view health indicators stored in the database 4 and to declare an expert diagnosis. Experts can thus observe the signals in which they are interested (for example depending on their specialty) and provide their expert diagnosis (performance problem, compression problem, too much vibration, etc.).

The calculator 5 is also configured to compare an operation diagnosis computed using the decision model starting from a set of health indicators with at least one expert diagnosis declared after viewing said set of health indicators. If there is disagreement between the computed operational diagnosis and the at least one declared expert diagnosis, the decision model can be modified, in other words relearning can be repeated so as to minimise the diagnosis error.

Figure 2:
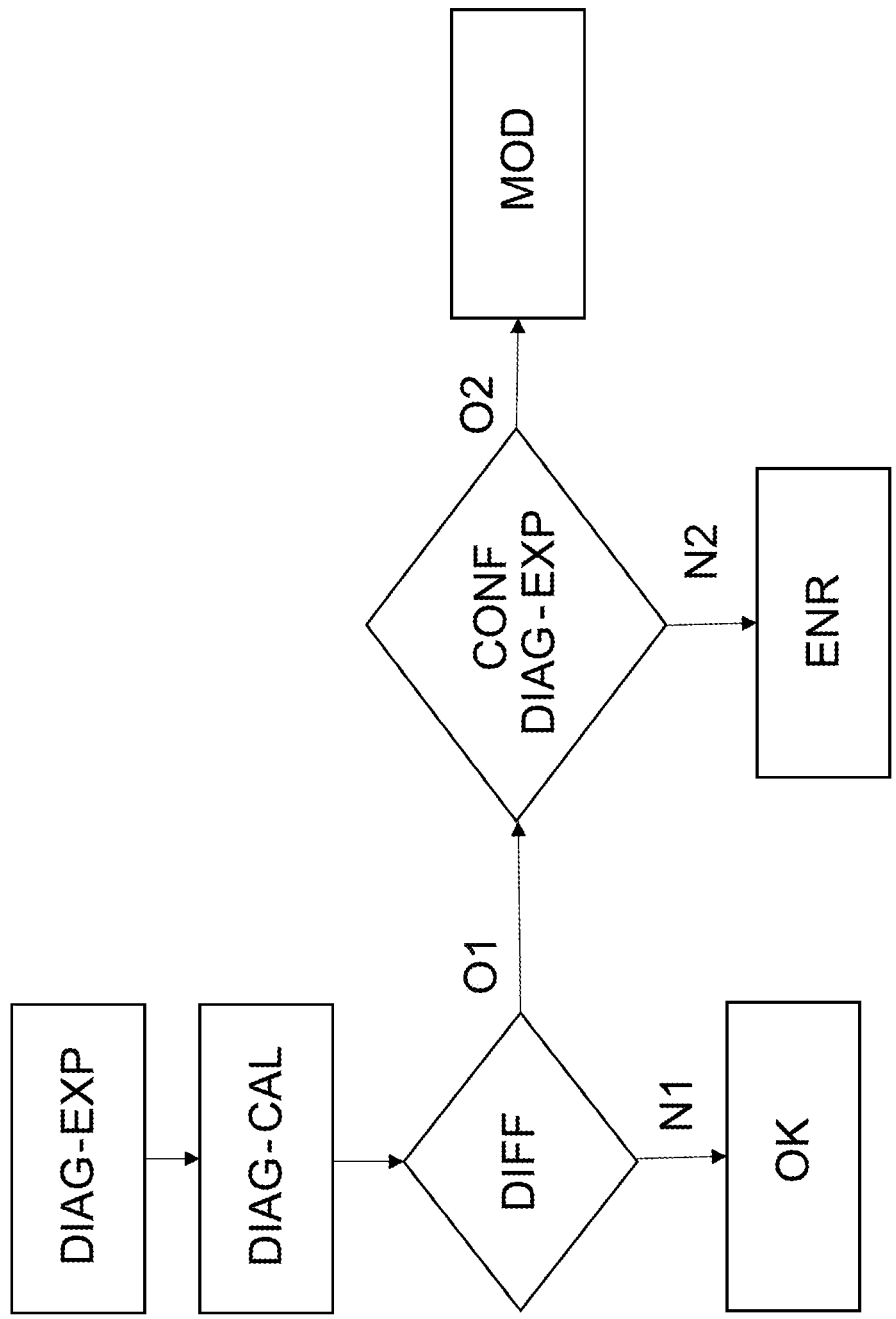
FIG. 2 diagrammatically illustrates a decision aid method for maintenance of a machine according to one possible embodiment of the invention.

FIG. 2 diagrammatically illustrates an example of how different steps can be chained to lead to a modification of the decision model in a method complying with one possible embodiment of the invention.

The method comprises a preliminary calibration step in which one or several experts study health indicators initially stored in the database 4 to provide their expert diagnoses of that learning of the decision model can be initialised.

Then, during a "DIAG-EXP" step, each expert in a panel of experts uses the man-machine interface 6 to consult and make an expertise of a set of health indicators stored in the database 4 and in return declares his expert diagnosis (containing his classification of the observed operation and the associated confidence level).

During a "DIAG-CAL" step, the calculator 5 computes an operational diagnosis from said set of health indicators using the previously learned decision model. During a "DIFF" step, the operational diagnosis computed automatically by the calculator is compared with the expert diagnoses. In case of agreement ("Ni"), an expertise level of the system, and particularly an expertise level to detect a given operation, can be reinforced.

In case of disagreement ("O1"), experts are asked during a "CONF DIAG-EXP" step to confirm their judgement, while possibly modifying the level of confidence that they assign to their judgement. To judge a disagreement, expertise levels of experts to identify the operation studied in the diagnosis can be taken into account, for example by weighting the importance of the diagnosis of each expert.

If the response is positive ("O2"), in other words if at least one disagreement case is confirmed, for example if several disagreement cases are confirmed so that a sufficient level of confidence can be given to the judgement of the disagreement, the learning model is modified in a "MOD" step. This modification consists of relearning rules of the model making use of the content of the database in which said set of health indicators is now associated with diagnoses of confirmed experts.

If the response is negative ("Ni"), in other words if experts accept the proposal of the system (they consider that the operational diagnosis is correct and, at least in some cases, invalidate their initial judgement), an "ENR" step is carried out in which this diagnosis is recorded in the database 4, where it is associated with said set of health indicators.

In order to make this confirmation/invalidation of their initial judgement, each expert in the panel can use the man-machine interface to view the expert diagnosis declared by each of some of the other experts on the panel, and the computed operation diagnosis.

Each expert can have an expertise level, and the calculator 5 can be configured, when the decision model is modified, to weight the importance of a confirmed expert diagnosis depending on the expertise level of the expert.

Since an expert can have different skills, the expertise level of an expert can be broken down into a set of expertise levels, each related to detection of a given operation. When an expert views the diagnosis of other experts and that computed by the system, he can be given the expertise levels of the experts and the system.

Experts can make an initial declaration of their skills, in other words their abilities to detect a given type of operation (for example an anomaly). When the experts panel evaluates an expert diagnosis, it can be labelled in relation to one or several skills. Thus, for a given expert, it is possible to count positive expert diagnoses (validated by the panel) for detection of a given type of operation, and thus to measure a success rate representative of the level of expertise for detection of said operation.

Similarly, the system also becomes an expert over time and therefore it is possible to evaluate its skills and therefore monitor its degree of maturity. For example, the system computes an operational diagnosis for a given operation A. To reach this conclusion, its decision model made use of previous experience that it was able to use to identify this type of operation. Therefore, it already had replies from experts with skills for operation A and it had therefore itself acquired an expertise level for this operation A. This level of expertise can be used to indicate the relevance of the system response. This relevance is even higher if the system has a good level of expertise for detection of other types of operation. For example, it has a good level of expertise for operation B, and it considers that operation is not type B.

And as described above, if the operation diagnosis for the given operation A is confirmed by the experts, then the expertise level of the system for detection of this operation A is reinforced.

The invention covers not only the decision aid system 1, but also the decision aid method for engine maintenance used by such a system. It also relates to a computer program including code instructions for the execution of steps in the method according to the invention, when said program is executed on a computer.

By taking expert opinions into account directly, the invention can overcome the lack of supervision of existing systems by creating a permanent knowledge base.

Experts also benefit from the invention through the statistical study that can be made of the histories of information provided by each of them. This gets them positively involved in the process. The invention uses the same information to calibrate itself and makes use of it to evaluate the skills of each group of experts.

The invention can be used to make a much more detailed calibration of algorithms for learning the decision model. The quality of the automated diagnosis is then better, so that degradation of parts can be anticipated and they can be quickly replaced as soon as a diagnosis shows degradation of the part. The sooner that degradation of a part is identified, the lower the risk that this part will cause damage to other engine parts with which it interacts. This, the invention can make repairs more efficient and reduce their cost by limiting firstly the number of parts to be replaced and secondly the number of inspections to be made by experts after reception of an alert.

The invention claimed is:

1. A decision aid system for the maintenance of an aircraft engine, comprising:
   anomaly detection modules each configured to determine health indicators from measurements of physical parameters of the aircraft engine,
   a calculator configured to compute an operational diagnosis using a supervised learning decision model and a set of health indicators from the determined health indicators,
   a man-machine interface configured in such a way as to allow at least one expert to consult the determined health indicators and to declare an expert diagnosis, and
   a database storing health indicators in association with expert diagnoses, wherein, using the content of the database, the supervised learning decision model is capable of automatically learning a set of rules for merging the set of health indicators and synthesizing the merged set of health indicators to provide the operational diagnosis,
   wherein the calculator is further configured:
   to compare the operational diagnosis computed using said set of health indicators with at least one expert diagnosis declared after consultation of said set of health indicators, and
   in the event of disagreement between the computed operational diagnosis and the at least one declared expert diagnosis, to store the at least one declared expert diagnosis in the database in association with said set of health indicators and to implement a relearning of the set of rules of the supervised learning decision model using the content of the database.

2. The decision aid system according to claim 1, wherein the calculator is configured to implement the relearning after declaration, through the man-machine interface, that at least one declared expert diagnostic is confirmed.

3. The decision aid system according to claim 2, wherein the calculator is configured not to implement the relearning after declaration, through the man-machine interface, that at least one declared expert diagnostic is invalidated.

4. The decision aid system according to claim 1, wherein the calculator is configured to compare the operational diagnosis computed from said set of health indicators with a plurality of expert diagnoses each declared after an expert belonging to a panel of experts has consulted said set of health indicators, and wherein the man-machine interface is also configured such that each expert in the panel can view the expert diagnosis declared by each or some of the other experts in the panel and the computed operational diagnostic.

5. The decision aid system according to claim 1, wherein the calculator is further configured, when the relearning is implemented, to weight the importance of at least one expert diagnosis declared by an expert by an expertise level of the expert.

6. The decision aid system according to claim 5, wherein the level of expertise is associated with a given type of aircraft engine operation.

7. The decision aid system according to claim 1, wherein the calculator is further configured to reinforce an expertise level of the decision aid system in case of agreement between the computed operational diagnosis and at least one declared expert diagnosis.

8. The decision aid system according to claim 1, wherein the supervised learning decision model is a naive Bayes classification.

9. The decision aid system according to claim 1, wherein the supervised learning decision model is a classification derived from the application of a decisional random forest algorithm.

10. A decision aid method for maintenance of an aircraft engine, comprising the steps of:

determining health indicators from measurements of physical parameters of the aircraft engine, storing health indicators in association with expert diagnoses in a database, using the content of the database, automatically learning a supervised learning decision model that comprises a set of rules for merging health indicators and synthesizing the merged health indicators to provide the operating diagnosis, calculating an operational diagnosis using the supervised learning decision model and a set of health indicators from the determined health indicators, consulting said set of health indicators by at least one expert and declaring an expert diagnosis by the at least one expert, comparing the computed operational diagnosis with the at least one declared expert diagnosis, and in the event of disagreement between the computed operational diagnosis and the at least one declared expert diagnosis, storing the at least one declared expert diagnosis in the database in association with said set of health indicators and implementing a relearning of the set of rules of the supervised learning decision model using the content of the database.

11. A non-transitory computer readable medium having stored thereon code instructions which, when executed by a processor, cause the processor to implement the comparing, storing and implementing the relearning step of the decision aid method according to claim 10.

* * * * *